(12) United States Patent
Wen et al.

(10) Patent No.: US 8,874,597 B2
(45) Date of Patent: Oct. 28, 2014

(54) METHOD AND SYSTEM FOR TEXT FILTERING BASED ON SEMANTIC MATCHING

(75) Inventors: Xinci Wen, Hangzhou (CN);
Changcheng Ye, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 24 days.

(21) Appl. No.: 13/055,984

(22) PCT Filed: Sep. 3, 2010

(86) PCT No.: PCT/US2010/047795
§ 371 (c)(1),
(2), (4) Date: Jan. 26, 2011

(87) PCT Pub. No.: WO2011/059551
PCT Pub. Date: May 19, 2011

(65) Prior Publication Data
US 2012/0221588 A1  Aug. 30, 2012

(30) Foreign Application Priority Data
Nov. 10, 2009  (CN) .......................... 2009 1 0211715

(51) Int. Cl.
*G06F 17/30* (2006.01)
(52) U.S. Cl.
CPC .... *G06F 17/30864* (2013.01); *G06F 17/30637* (2013.01)
USPC .......................................................... 707/758
(58) Field of Classification Search
USPC ........................................................ 707/758
See application file for complete search history.

(56) References Cited

U.S. PATENT DOCUMENTS

| 6,714,927 | B1 | 3/2004 | Ogawa |
| 7,809,551 | B2 | 10/2010 | Sandor et al. |

(Continued)

FOREIGN PATENT DOCUMENTS

| JP | 08305729 A | 11/1996 |
| JP | 2000268039 A | 9/2000 |
| JP | 2006293573 A | 10/2006 |
| WO | WO2009059420 A1 | 5/2009 |

OTHER PUBLICATIONS

Chinese Office Action mailed Dec. 7, 2012 for Chinese patent application No. 200910211715.0, a counterpart foreign application of U.S. Appl. No. 13/055,984, 10 pages.

(Continued)

*Primary Examiner* — Usmaan Saeed
*Assistant Examiner* — Jagdish Pandya
(74) *Attorney, Agent, or Firm* — Lee & Hayes, PLLC

(57) ABSTRACT

The present disclosure discloses a method and system for text filtering. The method for text filtering comprises: pre-defining a semantic keyword in a text filtering system, the semantic keyword comprising at least one basic keyword and one logical operator; after obtaining an input text, finding, by the text filtering system, the basic keyword constituting the semantic keyword in the input text according to the pre-defined semantic keyword; in an event that a text content matching the at least one basic keyword in the input text is found, further conducting a semantic match in the found text content, the semantic match further comprising matching the found text content with the semantic keyword according to the logical operator constituting the semantic keyword; and in an event that the semantic match is successful, filtering the matched text context.

13 Claims, 6 Drawing Sheets

(56) References Cited

U.S. PATENT DOCUMENTS

| | | | |
|---|---|---|---|
| 7,991,767 B2* | 8/2011 | Brooks et al. | 707/715 |
| 2003/0191847 A1* | 10/2003 | Vion-Dury et al. | 709/229 |
| 2006/0004744 A1 | 1/2006 | Nevidomski et al. | |
| 2006/0036588 A1* | 2/2006 | Frank et al. | 707/3 |
| 2008/0071769 A1 | 3/2008 | Jagannathan | |
| 2008/0208854 A1 | 8/2008 | Badr et al. | |
| 2008/0301135 A1 | 12/2008 | Alves et al. | |
| 2009/0182554 A1* | 7/2009 | Abraham et al. | 704/9 |
| 2009/0204588 A1 | 8/2009 | Hosono et al. | |
| 2009/0228468 A1 | 9/2009 | Qin et al. | |
| 2009/0327284 A1 | 12/2009 | Kataoka et al. | |
| 2010/0169243 A1 | 7/2010 | Su et al. | |
| 2010/0191724 A1 | 7/2010 | Ozonat et al. | |

OTHER PUBLICATIONS

Chinese Office Action mailed Jul. 23, 2012 for Chinese patent application No. 2009102117150, a counterpart foreign application of U.S. Appl. No. 13/055,984, 15 pages.

Translated the Japanese Office Action mailed Mar. 11, 2014 for Japanese patent application No. 2012-537879, a counterpart foreign application of U.S. Appl. No. 13/055,984, 9 pages.

Chinese Office Action mailed Mar. 28, 2013 for Chinese patent application No. 2009102117150, a counterpart foreign application of U.S. Appl. No. 13/055,984, 4 pages.

Chinese Office Action mailed Feb. 17, 2014 for Chinese patent application No. 2009102117150, a counterpart foreign application of U.S. Appl. No. 13/055,984, 2 pages.

* cited by examiner

METHOD AND SYSTEM FOR TEXT FILTERING BASED ON SEMANTIC MATCHING

CROSS REFERENCE TO RELATED PATENT APPLICATIONS

This application is a national stage application of an international patent application PCT/US10/47795, filed Sep. 3, 2010, which claims priority from Chinese Patent Application No. 200910211715.0 filed on Nov. 10, 2009, entitled "METHOD AND SYSTEM FOR TEXT FILTERING," which applications are hereby incorporated in their entirety by reference.

TECHNICAL FIELD

The present disclosure relates to internet technology, and particularly relates to a method and system for text filtering.

BACKGROUND

With the development of internet, the volume of information transferred over the internet has been ever-increasing. The openness of internet also allows lots of harmful information to flood the internet. Thus there is a general need to monitor and filter information on the internet.

The application of content filtering techniques can realize filtering of harmful information on the internet, thereby providing safe network environment. There are multiple representation forms of information available on internet. Text is one of the most common representation forms of information. Text filtering refers to a process of finding a specific text from large volumes of textual information. Currently the common text filtering methods are generally based on basic keyword matching technology such that a system, according to pre-set multiple keywords relating to harmful information, searches the input text. If there are contents matching the keywords in the input text, such contents or the entire input text will be filtered or replaced.

Such text filtering methods can only filter texts that completely match the keywords but cannot determine a position or attitude of the author as reflected in the text. For example, an e-commerce website may define "detectaphone" as a filtering keyword. The current text filtering method, in this example however, would likely regard a valid text such as "prohibition to sell detectaphone" as harmful information to filter. Thus the current text filtering methods based on basic keywords matching technologies have low identification accuracy rate and cannot meet practical application requirements for information filtering.

SUMMARY OF THE DISCLOSURE

To resolve the above problems, the present disclosure provides a method and system for text filtering to improve accuracy rate of text filtering. The techniques are summarized below.

In one aspect, a method for text filtering may comprise: storing a pre-defined semantic keyword in a text filtering system, the semantic keyword comprising at least a basic keyword and a logical operator; finding, by the text filtering system, the basic keyword of the semantic keyword in the input text according to the pre-defined semantic keyword; in an event that a text content matching the basic keyword in the input text is found, conducting a semantic match in the found text content, the semantic match comprising matching the found text content with the semantic keyword according to the logical operator of the semantic keyword; and in an event that the semantic match is successful, filtering a matched text context.

The basic keyword may use a character as a unit and may be stored in the text filtering system according to a tree-type structure. A first character of the basic keyword may be a root node and a last character of the basic keyword may be a leaf node in the tree-type structure. Basic keywords with an identical first character may share a common root node.

Finding the basic keyword of the semantic keyword in the input text according to the pre-defined semantic keyword may include: obtaining a character $c_1$ in the input text; using $c_1$ as a current character and using the root node of the tree-type structure as a current node to match the current character with the current node; in an event that the current character matches the current node and the current node has a child node, matching a next character following the current character with the child node of the current node; in an event that the current character does not match the current node and the current node has a sibling node, matching the current node with the sibling node of the current node; connecting the current node with the root node to obtain a matching route; and establishing the basic keyword according to the leaf node having a successful match result on the matching route.

The method may further comprise: before matching the current character with the current node, determining whether the current character has a corresponding prototype character in a dictionary; if affirmative, converting the current character into the corresponding prototype character and using the corresponding prototype character as the current character to match with the current node.

The semantic keyword may further comprise a filtering condition. The semantic match may further comprise matching an attribute of the input text with the filtering condition.

Alternatively, the semantic keyword may further comprise a filtering action. Filtering the matched text context may comprise filtering the matched text content according to the filtering action.

In another aspect, a text filtering system may comprise: a keyword storage unit, a basic finding unit, a semantic matching unit, and a filter processing unit. The keyword storage unit may store a pre-defined semantic keyword, the semantic keyword comprising at least a basic keyword and a logical operator. The basic finding unit may find the basic keyword of the semantic keyword in an input text according to the pre-defined semantic keyword. The semantic matching unit that, in an event that a text content matching the basic keyword in the input text is found, may conduct a semantic match in the found text content, the semantic match comprising matching the found text content with the semantic keyword according to the logical operator of the semantic keyword. The filter processing unit that, in an event that the semantic match is successful, may filter a matched text context.

The keyword storage unit may use a character as a unit and stores the basic keyword according to a tree-type structure. A first character of the basic keyword may be a root node and a last character of the basic keyword may be a leaf node, basic keywords having an identical first character sharing a common root node.

The basic finding unit may comprise: a text obtaining sub-unit that obtains a character $c_1$ in the input text, a character matching sub-unit, and a determination sub-unit.

The character matching sub-unit may use $c_1$ as a current character and use the root node of the tree-type structure as a current node to match the current character with the current node. In an event that the current character matches the current node and the current node has a child node, the character matching sub-unit may match a next character following the current with the child node of the current node. In an event that the current character does not match the current node and the current node has a sibling node, the character matching sub-unit may match the current node with the sibling node of the current node.

The determination sub-unit may connect the current node and the root node to obtain a matching route, and establish the basic keyword according to the leaf node having a successful match result on the matching route.

The basic finding unit may further comprise a character conversion sub-unit that determines whether the current character has a corresponding prototype character in a dictionary before the character matching sub-unit conducts matching and, if affirmative, converts the current character into the corresponding prototype character.

The character matching sub-unit may use the corresponding prototype character as the current character to match with the current node.

The semantic keyword may comprise a filtering condition. The semantic matching unit may comprise a category matching sub-unit that matches an attribute of the input text with the filtering condition.

Alternatively, the semantic keyword may comprise a filtering action. The filter processing unit may filter the matched text content according to the filtering action.

The method and system for text filtering disclosed by the present disclosure use a combination of basic keyword and local operator to filter the text content. Compared with the existing technologies, it can effectively combine basic keyword to filter semantics in the whole text, thereby increasing filtering accuracy.

DESCRIPTION OF DRAWINGS

To better illustrate embodiments of the present disclosure or techniques of the current technologies, the following is a brief introduction of Figures to be used in descriptions of the embodiments or the existing technologies. The following Figures only relate to some embodiments of the present disclosure. A person of ordinary skill in the art can obtain other figures according to the Figures without creative efforts.

DETAILED DESCRIPTION

Figure 1:
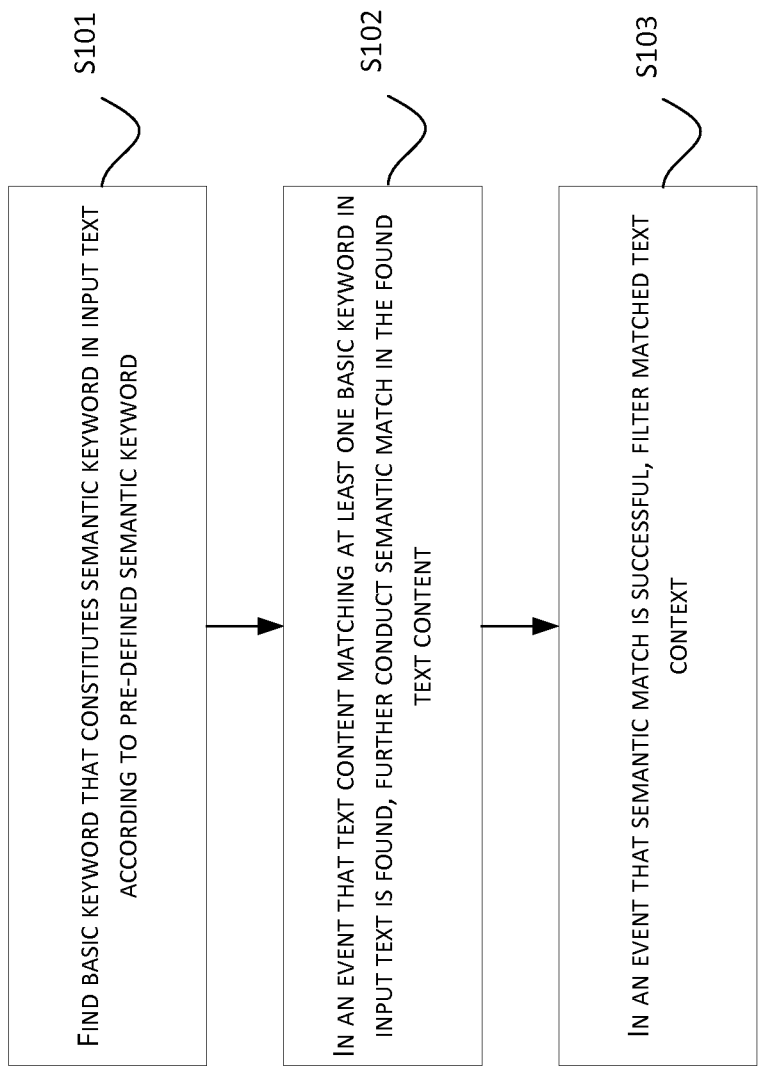
FIG. 1 illustrates a process of text filtering in accordance with the present disclosure.

Existing text filtering methods typically filter based solely on basic keywords and do not have logical analysis capability. Thus there are many situations of misreporting. For example, the above referred "prohibition to sell detectaphone" text, although including the keyword "detectaphone" that is in a combination with a negative word "prohibition", should be treated as valid information and not be filtered. With respect to this problem, the present disclosure provides a technique for text filtering.

In one embodiment, a method of text filtering includes: pre-defining and storing a semantic keyword in a text filtering system, the semantic keyword comprising at least one basic keyword and one logical operator; after obtaining an input text, finding, by the text filtering system, the basic keyword that constitutes the semantic keyword in the input text according to the pre-defined semantic keyword; in an event that a text content matching at least one basic keyword in the input text is found, further conducting a semantic match in the found text content, the semantic match further comprising matching the found text content with the semantic keyword according to the logical operator constituted the semantic keyword; and in an event that the semantic matching is successful, filtering the matched text context.

The above text filtering method uses a combination of basic keyword and logical operator to filter the text content. Compared with the existing technologies, the proposed technique can effectively filter text by considering the semantics of the basic keyword in the whole text, reduce chances of misreporting, and increase filtering accuracy.

To aid a person of ordinary skill in the art to better understand techniques of the present disclosure, the techniques of the present disclosure are described clearly and completely by reference to the Figures. The embodiments described herein only relate to some but not all embodiments of the present disclosure. A person of ordinary skill in the art can obtain other embodiments based on the disclosed embodiments in the present disclosure without creative efforts. Such embodiments also fall within the protection scope of the present disclosure.

First Example

In the present disclosure, text contents are filtered based on semantic keywords. A semantic keyword is composed of two basic components: a basic keyword and a logical operator. The basic keyword is an independent word or phrase, and may be equivalent to a simple keyword accepted by the existing technologies. The logical operator is used to express logical relationships. The basic logical relationships include: and, or, and negative, which can be respectively represented by symbols "&", "|", and "~." The following are some simple examples of semantic keywords in text filtering of e-commerce websites.

(a) Mobile Wiretapping ~ Anti

The semantics represented by the above semantic keyword may be interpreted to mean that if product information includes "mobile wiretapping" and does not include "anti," such production information needs to be filtered.

(b) Surveillance Camera | Wireless Surveillance Camera

The semantics represented by the above semantic keyword may be interpreted to mean that if product information includes "surveillance camera" or "wireless surveillance camera," such production information needs to be filtered.

(c) Military & Binding

The semantics represented by the above semantic keyword may be interpreted to mean that if product information includes "military" and "binding," such production information needs to be filtered.

For one semantic keyword, its simplest form may be two basic keywords plus one logical operator. The above three examples all belong to such situation. When the semantic keyword only includes on basic keyword, text filtering is actually the same as the existing technologies. The present disclosure does not describe in details of such situation. It is appreciated that one semantic keyword can include more basic keywords and logical operators to express more complicated semantics. An example is provided below.

(d) Mobile Wiretapping ~ (Anti | Prevent)

The semantics represented by the above semantic keyword may be interpreted to mean that if product information includes "mobile wiretapping" and does not include "anti" or "prevent," such production information needs to be filtered.

In a preferred embodiment of the present disclosure, contents of the semantic keyword can be further extended, as described below.

The semantic keyword can include a filtering condition. In fact, different from the above-mentioned basic keyword and logical operator, the filtering condition is irrelevant to details in contents of the text. The function of the filtering condition is to make further restriction to filtering based on other attributes of the text, such as a restriction to a source of the text or a category of the text, to implement more accurate filtering.

The semantic keyword can further include a filtering action to provide a detailed processing of text contents matching the semantic keyword, such as content filter, content replacement and so on.

The following three examples add a filtering condition and a filtering action respectively to the above (a), (b), and (c) examples to illustrate an extended form of the semantic keyword. A portion before a semicolon is the basic keyword and the logical operator. A portion after the semicolon is an extended content. Various extended contents are separated by a comma This embodiment of the present disclosure does not restrict a specific format of the semantics.

(a1) Mobile Wiretapping ~ Anti; Product Category: 1002, Filtering Action: Off-Shelf The semantics represented by the above semantic keyword may be interpreted to mean that if product information includes "mobile wiretapping" and does not include "anti," and the product category is 1002, such production information needs to be placed off-shelf.

(b1) Surveillance Camera | Wireless Surveillance Camera; Product Category: 101, Filtering Action: Off-Shelf The semantics represented by the above semantic keyword may be interpreted to mean that if product information includes "surveillance camera" or "wireless surveillance camera," and the product category is 101, such production information needs to be placed off-shelf (c1) Military & Binding; Product Category: 50001, Filtering Action: Off-Shelf The semantics represented by the above semantic keyword may be interpreted to mean that if product information includes "military" and "binding," and the product category is 50001, such production information needs to be placed off-shelf.

The following description illustrates the embodiment by reference to a detailed process. FIG. 1 illustrates a method of a text filtering which includes a number of steps as described below.

S101: After obtaining an input text, a text filtering system finds a basic keyword that constitutes a semantic keyword in the input text according to the pre-defined semantic keyword.

In this step, the text filtering system, after obtaining a portion of the input text, searches for the basic keyword in the input text and records a search result. For example, with respect to the above example (b) or (b1), the text filtering system firstly searches "surveillance camera" and "wireless surveillance camera." A detailed implementation of this step is similar to a matching method based on the simple keyword under the existing technologies, and will not be described in details herein in the interest of brevity.

S102: In an event that a text content matching at least one basic keyword in the input text is found, the process conducts a semantic match in the found text content.

In the step S101 the search is only based on the basic keyword. In an event that no content matching any basic keyword is found, there is no need to conduct filter processing of the input text. In an event that a text content matching at least one basic keyword is found, the text filtering system further compares the found text content with a complete semantic keyword. This step is referred to as semantic matching.

In an event that the semantic keyword only includes the basic keyword and the logical operator, detailed contents of the semantic matching are as follows: according to the logical operator in the pre-defined semantic keyword, the found text content is matched with the semantic keyword. An example is described below.

With respect to the above example (a), the text filtering system finds the basic keyword "mobile wiretapping" and does not find the basic keyword "anti" in the input text. In other words, an actual search result of the two basic keywords matches the defined logical relationship "not" of the two basic keywords in the semantic keyword (a). Thus the found text content matches the semantic keywords (a).

With respect to the above example (c), the text filtering system finds the basic keyword "binding", and does not find the basic keyword "military." In other words, an actual search result of the two basic keywords does not match the logical relationship "and" of the two basic keywords in the semantic keyword (c). Thus the found text content does not match the semantic keyword (c).

In an event that the semantic keyword also includes the extended content "filtering condition," a matching result between an attribute of the input text and the filtering condition is further considered when the semantic matching is conducted.

S103: In an event that the semantic match is successful, the process filters the matched text context.

With respect to the text successfully matching the semantic keyword in the step S102, the text filtering system will carry out the filtering process. In an event that the semantic keyword includes the "filtering action," the text filtering system will conduct filter processing of the text according to detailed contents of the "filtering action." In an event that the semantic keyword does not include the "filtering action," the text filtering system will carry out filtering process according to a pre-defined default method.

Second Example

The existing technologies typically require searching every word one-by-one in the input text. With respect to the step S101, the present disclosure provides an improved method for searching the basic keyword to increase the processing efficiency in keyword search.

In a practical text filtering application, many words to be filtered have the same portions, such as "wiretap," "wiretap device," "wiretap software," and etc. For such words, a method for tree-type searching can be used to improve the searching efficiency.

Firstly, the text filtering system uses character as a unit to store each basic keyword according to a tree-type structure. The first character of the basic keyword is a root node and the last character of the basic keyword is a leaf node. Basic keywords with the same first character share a same root node. For example, with respect to the basic keywords "ab," "abc," and "ade", they can be stored by using a structure shown in the FIG. 2.

Figure 2:
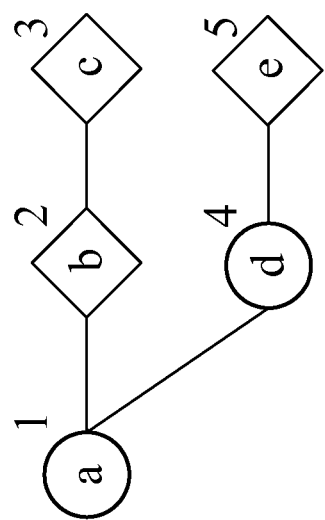
FIG. 2 illustrates a tree-type store structure of basic keywords in accordance with the present disclosure.

In FIG. 2, a circle represents a root node or a general node. A diamond represents a leaf node. Because the three words "ab," "abc," and "ade" start with the same first character "a," they share a same root node 1. The last character of the three words is "b," "c," and "e", respectively. Thus these three characters are leaf nodes 2, 3, and 5, respectively. It is appreciated that, with respect to character "b," it is not the last character in the keyword "abc" but is the last character in the keyword "ab." Thus the character "b" still becomes a leaf node. In other words, the leaf node is not necessarily an end node of the tree-type structure; however, the end node of the tree-type structure is a leaf node.

Figure 3:
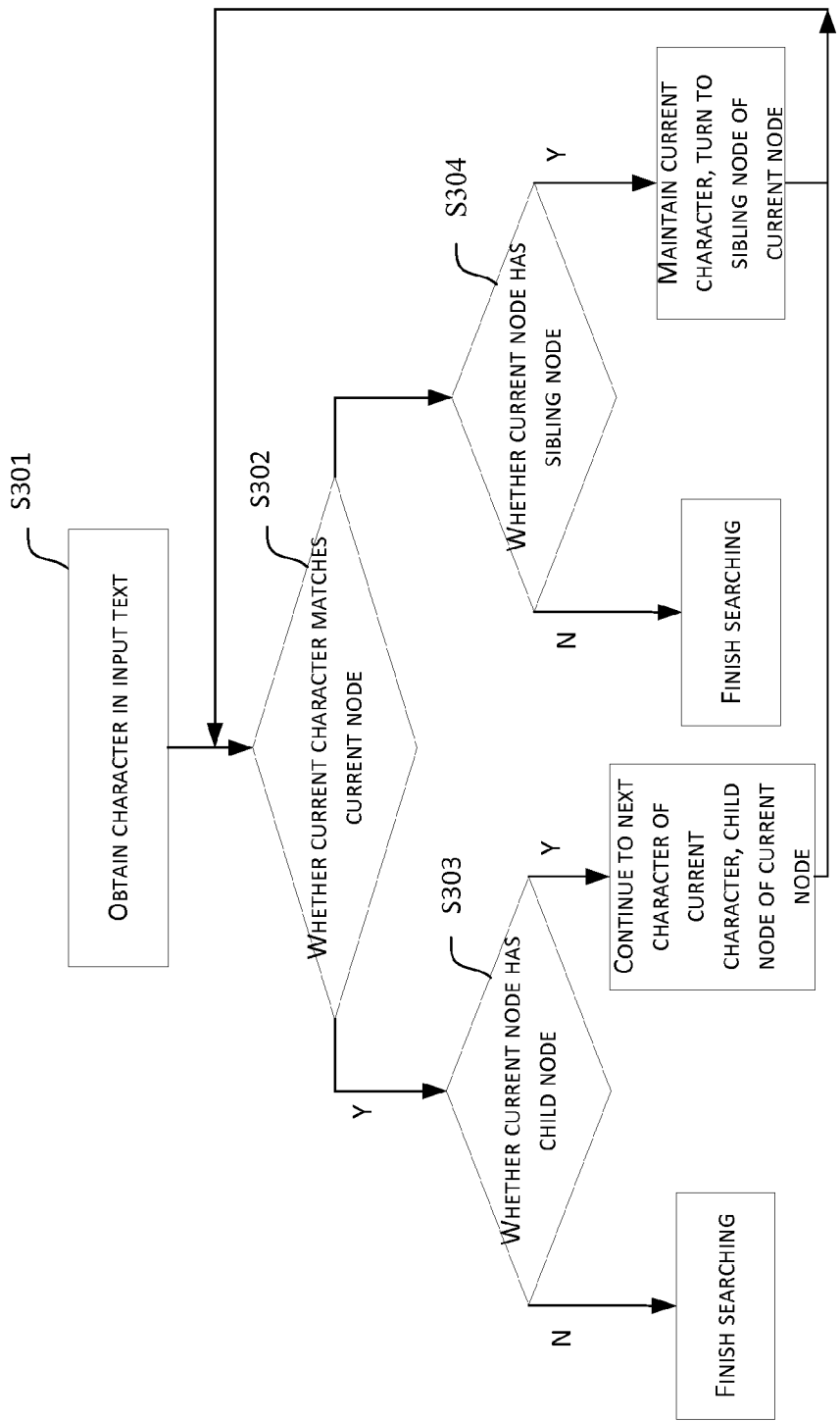
FIG. 3 illustrates a process of searching method of basic keywords in accordance with the present disclosure.

FIG. 3 illustrates a method for searching basic keywords in accordance with the present disclosure. The method includes a number of steps as described below.

S301: The process obtains a character in the input text, sets up the character as a current character as well as a root node of the tree-type structure as a current node. According to practical filtering application requirements, the obtained character may be the first character of the input text or a character at any place in the input text.

S302: The process matches the current character with the current node. In an event that the match is successful, the process proceeds to S303; otherwise the process proceeds to S304.

S303: The process determines whether the current node has a child node. If the result is negative, the search ends. If the result is affirmative, the search continues on to the next character that follows the current character in the input text, which is the child node of the current node, and the step S302 is performed.

S304: The process determines whether the current node has a sibling node. If the result is negative, the search ends. If the result is affirmative, the current character is maintained and unchanged, the search continues on to the sibling node of the current node, and the step S302 is performed.

After the search is completed, the text filtering system connects the current node with the root node to obtain a matching route, and determines the found basic keyword according to the leaf node having successful match on the matching route.

By way of two specific examples, the method for searching basic keywords based on the tree-type structure is described below.

(1) The input text is assumed to be "adf." After obtaining the character "a," the text filtering system traverses root nodes of a keyword database, and finds that it matches a node 1. The node 1 also has child nodes. The text filtering system further matches the character "d" with child nodes 2 and 4 of the node 1.

The character "d" successfully matches the node 4, and the node 4 has a child node. The text filtering system further matches the character "f" with a child node 5 of the node 4.

The match between the character "f" and the node 5 fails, and the node 5 has no other sibling nodes. At this time the searching ends. The current matching route is 1-4-5, and the matching route does not include a successfully matched leaf node. Therefore, it can be determined that there is no basic keyword in the input text.

(2) The input text is assumed to be "abc." After obtaining the character "a," the text filtering system traverses root nodes of the keyword database, and finds that it matches the node 1. The node 1 also has child nodes. The text filtering system further matches the character "b" with child nodes 2 and 4 of the node 1.

The character "b" successfully matches the node 2, and the node 2 has a child node. The text filtering system further matches the character "c" with a child node 3 of the node 2.

The match between the character "c" and the node 4 succeeds, and the node 3 has no other sibling nodes. At this time the searching ends. The current matching route is 1-2-3. Both the node 2 and the node 3 are the successfully matched leaf nodes. Therefore, it can be determined that the basic keywords "ab" and "abc" are found in the input text according to contents of the node 2 and the node 3.

In the application of the method for searching basic keywords based on the tree-type structure, a matching operation at each level only targets nodes having successful matching result in the last match. Thus there is no need to match each character of the input text with all keyword characters, thereby effectively increasing the processing efficiency of keyword searching.

The above examples are illustrated by using the first character as the root node. Such method is applicable to a situation when multiple basic keywords have the same prefix, e.g., the same first character. It is appreciated that, when multiple basic keywords have the same postfix such as "telephone wiretap," "mobile wiretap," "device wiretap," the basic keyword can also be stored in a tree-type structure where the last character of the basic keyword is the root node and the first character is the leaf node. Correspondingly, in the matching process, the process may follow an order from end to beginning of a keyword to match characters of the input text. The detailed implementation for such process is similar to those described above and thus will not be duplicated here in the interest of brevity.

In addition, to prevent text filtering, there are many persons using special characters in the published text, such as "w-i-r-e-t-a-p-d-e-v-i-c-e," and the like. With respect to such situation, the text filtering system can further combine dictionary functions to search the keyword.

A dictionary defines a set of characters, and defines a prototype of a character. The prototype can be the character itself For example, the prototype of character "a" is "a" itself The prototype can be also another character. For example, a prototype of a traditional Chinese character is its corresponding simple Chinese character. In Chinese-language applications, the frequently used dictionaries include: a simple Chinese dictionary, a traditional Chinese dictionary, an English dictionary, and a number dictionary. In addition, administrative personnel can also self-define dictionary according to the actual needs. For example, a prototype of character "-" is defined as a null character.

According to the aforementioned step S302, the text filtering system can search whether the current character comprises a prototype character before matching the current character with the current node. If affirmative, the text filtering system converts the current character into the corresponding prototype character, and uses the prototype character as the current character to match the current node.

As an example of the aforementioned example (2), assuming the input text is "aBc", the text filtering system, before matching the character "B" with the node 2, through traversing all dictionaries finds that the character "B" has a prototype "b," converts "B" in the original input text into the prototype "b," and uses "b" as the current character to match the node 2.

For text such as "w-i-r-e-t-a-p", the text filtering system, through querying the dictionary, converts the character "-" to the null character. During the matching process, when the text filtering system matches characters after "w", it jumps across the null character and directly matches the character "i."

Therefore, by using one or more dictionaries and converting characters, the text filtering system can identify more inappropriate information, thereby realizing better text filtering results.

Figure 4:
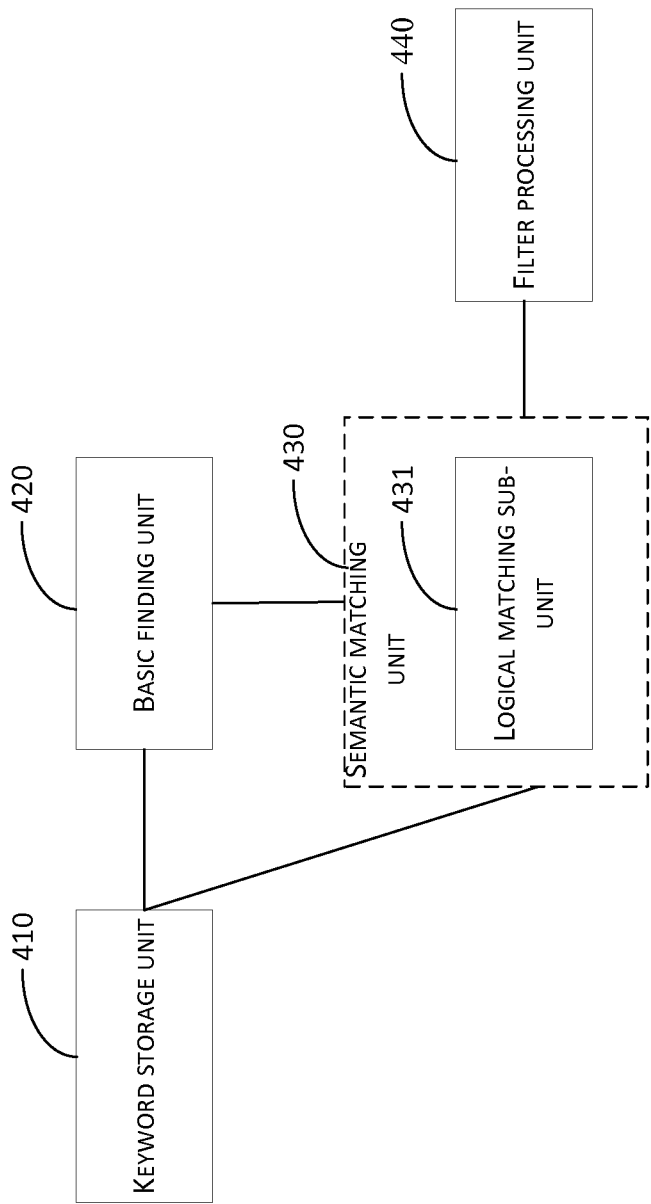
FIG. 4 illustrates an exemplary diagram of a text filtering system in accordance with the present disclosure.

Corresponding to the above described method embodiments, the present disclosure also provides a text filtering system with reference to the FIG. 4. The text filtering system includes a number of components as described below.

A keyword storage unit 410 stores a pre-defined semantic keyword, the semantic keyword comprising at least one basic keyword and one logical operator;

A basic finding unit 420, after an input text is obtained by the system, finds the basic keyword that constitutes the semantic keyword in the input text according to the pre-defined semantic keyword.

A semantic matching unit 430, in an event that a text content matching at least one basic keyword in the input text is found, conducts a semantic match in the found text content. The semantic matching unit 430 further comprises a logical matching sub-unit 431 that matches the found text content with the semantic keyword according to the logical operator that composes the semantic keyword.

A filtering processing unit 440, in an event that the semantic matching unit 430 successfully matches, filters the matched text context.

The keyword storage unit 410 uses a character as a unit and stores the basic keyword according to the tree-type structure. The first character of the basic keyword is the root node and the last character is a leaf node. Basic keywords having the same first character share the same root node.

Figure 5:
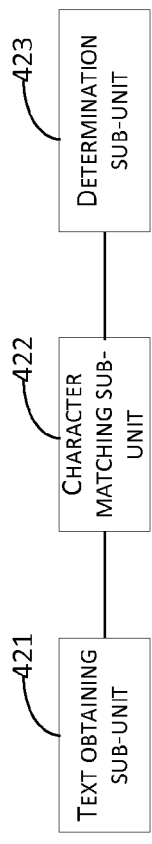
FIG. 5 illustrates an exemplary diagram of a basic finding unit in accordance with the present disclosure.

As shown in FIG. 5, the basic finding unit 420 may include a number of sub-components as described below.

A text obtaining sub-unit 421 obtains a character c1 in the input text.

A character matching sub-unit 422 uses c1 as the current character and the root node of the tree-type structure as the current node to match the current character with the current node. In an event that the current character matches the current node and the current node has a child node, the character matching sub-unit 422 matches the next character following the current with the child node of the current node. In an event that the current character does not match the current node and the current node has a sibling node, the character matching sub-unit 422 matches the current node with the sibling node of the current node. This process can be repeated.

A determination sub-unit 423 connects the current node and the root node to obtain the matching route, and determines the found basic keyword according to the leaf node having the successful matching result on the matching route.

Figure 6:
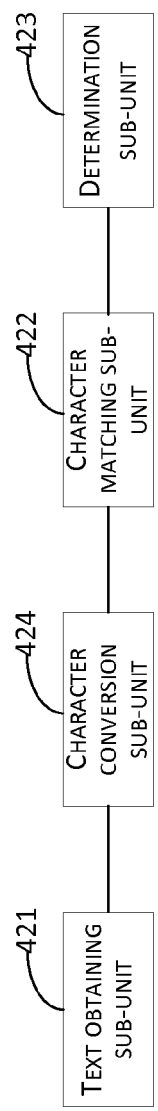
FIG. 6 illustrates another exemplary diagram of the basic finding unit in accordance with the present disclosure.

As shown in FIG. 6, the basic finding unit 420 may further include a character conversion sub-unit 424 that determines whether the current character has the prototype character in the dictionary before the character matching sub-unit 422 conducts matching. If affirmative, the character conversion sub-unit 424 converts the current character into the corresponding prototype character.

The character matching sub-unit 422 uses the prototype character as the current character and matches it with the current node.

The semantic keyword may further include a filtering condition.

Figure 7:
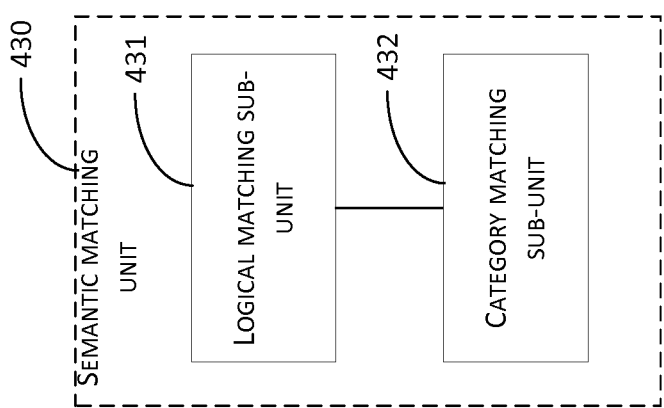
FIG. 7 illustrates an exemplary diagram of a semantic matching unit in accordance with the present disclosure.

The semantic matching unit 430 may further include a category matching sub-unit 432 that matches an attribute of the input text with the filtering condition as shown in FIG. 7.

The semantic keyword may further include a filtering action.

The filter processing unit 440 may be further configured to filter the found text content according to the filtering action.

For the sake of convenient description, the above system is functionally divided into various units which are separately described. When implementing the disclosed system, the functions of various units may be implemented in one or more instances of software and/or hardware.

From the exemplary embodiments described above, one of ordinary skill in the art can clearly understand that the disclosed method and system may be implemented using software and universal hardware platform. Based on this understanding, the technical scheme of the present disclosure may be implemented in the form of computer-executed instructions which are stored in one or more non-transitory computer-readable storage media such as ROM/RAM, flash memory, EEPROM, USB drive, hard drive and optical disk. The computer-executable instructions may be executed by a computing device (e.g., personal computer, server or networked device) to carry out embodiments of the method described in the present disclosure.

The various exemplary embodiments are progressively described in the present disclosure. Same or similar portions of the exemplary embodiments can be mutually referenced. Each exemplary embodiment has a different focus than other exemplary embodiments. In particular, the exemplary system embodiment has been described in a relatively simple manner because of its fundamental correspondence with the exemplary method. Details thereof can be referred to related portions of the exemplary method. Descriptions of the above exemplary system are meant for illustrative purpose only. Units described as separate components therein may or may not be physically separated. Components illustrated in terms of units may or may not be physical units, e.g., may be located in one place or may be distributed among multiple network units. Depending on the actual needs, the goal of the exemplary embodiments may be achieved by selecting parts or all of the modules. One of ordinary skill in the art can understand and implement the disclosed embodiments without any innovative effect.

The present disclosure may be used in an environment or in a configuration of universal or specialized computer systems. Examples include a personal computer, a server computer, a handheld device or a portable device, a tablet device, a multi-processor system, a microprocessor-based system, a set-up box, a programmable customer electronic device, a network PC, a small-scale computer, a large-scale computer, and a distributed computing environment including any system or device above.

The present disclosure may be described within a general context of computer-executable instructions executed by a computer, such as a program module. Generally, a program module includes routines, programs, objects, modules, and data structure, etc., for executing specific tasks or implementing specific abstract data types. The disclosed method and server may also be implemented in a distributed computing environment. In the distributed computing environment, a task is executed by remote processing devices which are connected through a communication network. In distributed computing environment, the program module may be located in storage media (which include storage devices) of local and remote computers.

Above are only preferred exemplary embodiments of the present disclosure. However, the present disclosure is not limited hereto. It is appreciated that one of ordinary skill in the art can alter or modify the present disclosure in many different ways without departing from the spirit and the scope of this disclosure. These modifications and variations should therefore be considered to fall within the scope of the claims of the present disclosure and their equivalents.

What is claimed is:

1. A method comprising:
under control of one or more processors configured with executable instructions:
storing a semantic keyword in a text filtering system, the semantic keyword comprising at least a basic keyword and a logical operator;
finding the basic keyword of the semantic keyword in an input text, the finding comprising:
obtaining a character c1 in the input text;
using c1 as a current character and a root node of a tree-type structure as a current node, the root node corresponding to one of a first character or a last character of the basic keyword;
determining whether the current character matches the current node;
in an event that the current character matches the current node and the current node has a child node, setting a next character following or preceding the current character to be the current character, setting the child node to be the current node and repeating the determining of whether the current character matches the current node;
in an event that the current character does not match the current node and the current node has a sibling node, setting the sibling node to be the current node and repeating the determining of whether the current character matches the current node;
in an event that the current character matches the current node and the current node does not have a child node or the current character does not match the current node and the current node does not have a sibling node, connecting the last matched current node to the root node to obtain a matching route; and
determining whether the basic keyword is found in the input text based at least in part on whether the matching route includes a successfully matched leaf node of the tree-type structure;
in response to finding a text content matching the basic keyword in the input text,
conducting a semantic match in the found text content, the semantic match comprising:
matching the found text content with the semantic keyword according to the logical operator included in the semantic keyword; and
in an event that the semantic match is successful, filtering a matched text context.

2. The method as recited in claim 1, further comprising:
before matching the current character with the current node, determining whether the current character has a corresponding prototype character in a dictionary; and
when affirmative, converting the current character into the corresponding prototype character and using the corresponding prototype character as the current character to match with the current node.

3. The method as recited in claim 1, wherein:
the semantic keyword further comprises a filtering action; and
filtering the matched text context comprises filtering the matched text content according to the filtering action.

4. The method as recited in claim 1, further comprising:
storing a plurality of semantic keywords, the plurality of semantic keywords comprising at least a plurality of basic keywords;
storing first multiple basic keywords of the plurality of basic keywords having a same prefix in a first tree-type structure; and
storing second multiple basic keywords of the plurality of basic keywords having a same postfix in a second tree-type structure.

5. A text filtering system comprising:
one or more processors;
memory;
a keyword storage unit stored in the memory and executable by the one or more processors that stores a plurality of semantic keywords;
a basic finding unit stored in the memory and executable by the one or more processors that finds a basic keyword of a semantic keyword in an input text;
a semantic matching unit stored in the memory and executable by the one or more processors that, in an event that a text content matching the basic keyword in the input text is found, conducts a semantic match in the found text content, the semantic match comprising matching the found text content with the semantic keyword according to the logical operator included in the semantic keyword; and
a filter processing unit stored in the memory and executable by the one or more processors that, in an event that the semantic match is successful, filters a matched text context, wherein the basic finding unit comprises:
a text obtaining sub-unit that obtains a character c1 in the input text;
a character matching sub-unit that:
uses c1 as a current character and a root node of a tree-type structure as a current node, the root node corresponding to one of a first character or a last character of the basic keyword,
determines whether the current character matches the current node,
in an event that the current character matches the current node and the current node has a child node, sets a next character following or preceding the current character to be the current character, sets the child node to be the current node and repeats the determining of whether the current character matches the current node,
in an event that the current character does not match the current node and the current node has a sibling node, sets the sibling node to be the current node and repeats the determining of whether the current character matches the current node, and
in an event that the current character matches the current node and the current node does not have a child node or the current character does not match with the current node and the current node does not have a sibling node; and
a determination sub-unit that:
connects the last matched current node to the root node to obtain a matching route, and
determines whether the basic keyword is found in the input text based at least in part on whether the matching route includes a successfully matched leaf node of the tree-type structure.

6. The system as recited in claim 5, wherein:
the basic finding unit further comprises a character conversion sub-unit that determines whether the current character has a corresponding prototype character in a dictionary and converts the current character into the corresponding prototype character in response to determining that the current character has the corresponding prototype character in the dictionary; and the character matching sub-unit uses the corresponding prototype character as the current character to match with the current node.

7. The system as recited in claim 5, wherein:
the semantic keyword comprises a filtering condition; and
the semantic matching unit comprises a category matching sub-unit that matches an attribute of the input text with the filtering condition.

8. The system as recited in claim 5, wherein:
the semantic keyword comprises a filtering action; and the filter processing unit filters the matched text content according to the filtering action.

9. One or more non-transitory computer-readable storage media having computer-executable instructions stored thereupon that, when executed by one or more processors, cause the one or more processors to perform acts comprising:

storing a plurality of semantic keywords in a text filtering system;

finding a basic keyword of a semantic keyword of the plurality of semantic keywords in the input text;

in an event that a text content matching the basic keyword in the input text is found, conducting a semantic match in the found text content, the semantic match comprising matching the found text content with the semantic keyword according to a logical operator included in the semantic keyword; and in an event that the semantic match is successful, filtering a matched text context, wherein:

the basic keyword uses a character as a unit and is stored in the text filtering system according to a tree-type structure; and one of a first character or a last character of the basic keyword is a root node and another one of the first character or the last character of the basic keyword is a leaf node in the tree-type structure, basic keywords with an identical first character or an identical last character sharing a common root node;

finding the basic keyword of the semantic keyword in the input text comprises:

obtaining a character c1 in the input text;

using c1 as a current character and a root node of a tree-type structure as a current node, the root node corresponding to one of a first character or a last character of the basic keyword;

determining whether the current character matches the current node;

in an event that the current character matches the current node and the current node has a child node, setting a next character following or preceding the current character to be the current character, setting the child node to be the current node and repeating the determining of whether the current character matches the current node;

in an event that the current character does not match the current node and the current node has a sibling node, setting the sibling node to be the current node and repeating the determining of whether the current character matches the current node;

in an event that the current character matches the current node and the current node does not have a child node or the current character does not match the current node and the current node does not have a sibling node, connecting the last matched current node to the root node to obtain a matching route; and determining whether the basic keyword is found in the input text based at least in part on whether the matching route includes a successfully matched leaf node of the tree-type structure.

10. The one or more non-transitory computer-readable storage media as recited in claim 9, the acts further comprising:

before matching the current character with the current node, determining whether the current character has a corresponding prototype character in a dictionary; and when affirmative, converting the current character into the corresponding prototype character and using the corresponding prototype character as the current character to match with the current node.

11. The one or more non-transitory computer-readable storage media as recited in claim 9, wherein:

the semantic keyword further comprises a filtering condition; and the semantic match further comprises matching an attribute of the input text with the filtering condition.

12. The one or more non-transitory computer-readable storage media as recited in claim 9, wherein:

the semantic keyword further comprises a filtering action; and filtering the matched text context comprises filtering the matched text content according to the filtering action.

13. The one or more non-transitory computer-readable storage media as recited in claim 9, the acts further comprising storing multiple basic keywords having a same postfix in another tree-type structure.

\* \* \* \* \*